(12) United States Patent
Kuwertz et al.

(10) Patent No.: US 12,159,391 B2
(45) Date of Patent: Dec. 3, 2024

(54) SYSTEM FOR CHARACTERIZING OILFIELD TOOLS

(71) Applicant: Schlumberger Technology Corporation, Sugar Land, TX (US)

(72) Inventors: Luke Alexander Kuwertz, Houston, TX (US); Manikiran Bandi, Pearland, TX (US); Ambalavanan Sachidanandam, The Woodlands, TX (US); Amol Mulunjkar, Pune (IN); Pradeep Kumar Shetty, Houston, TX (US); Joshua Gatell, Cypress, TX (US); Jaijith Sreekantan, Trivandrum (IN); Sreekanth Asodi, Pune (IN); Charles Wiley Long, Spring, TX (US); Anjie Dong, Spring, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/053,260

(22) Filed: Nov. 7, 2022

(65) Prior Publication Data

US 2023/0106199 A1 Apr. 6, 2023

Related U.S. Application Data

(63) Continuation of application No. 16/294,983, filed on Mar. 7, 2019, now Pat. No. 11,494,887.

(Continued)

(51) Int. Cl.
G06T 7/00 (2017.01)
G06N 3/04 (2023.01)
(Continued)

(52) U.S. Cl.
CPC ............. G06T 7/0004 (2013.01); G06N 3/04 (2013.01); G06N 5/04 (2013.01); G06T 11/20 (2013.01);
(Continued)

(58) Field of Classification Search
CPC ...... G06N 3/04; G06N 3/0445; G06N 3/0454; G06N 3/0472; G06N 3/082; G06N 5/04;
(Continued)

(56) References Cited

U.S. PATENT DOCUMENTS 7,286,959 B2 10/2007 Steinke
7,693,695 B2 4/2010 Huang et al.
(Continued)

FOREIGN PATENT DOCUMENTS

CN 101670533 A 3/2010
CN 103433806 A 12/2013
(Continued)

OTHER PUBLICATIONS

First Office Action issued in China Patent Application No. 20191011709681 dated Jun. 16, 2023, 22 pages.
(Continued)

*Primary Examiner* — Zhiyu Lu
(74) *Attorney, Agent, or Firm* — Bryan K. Adams

(57) ABSTRACT

A system, method, and computer-readable storage medium, of which the method includes receiving an image of a tool including a consumable object from a remote device via a network at a processor, decoding the image to identify the consumable object, using the processor, and determining a degradation characteristic, a consumption, or both for the consumable object by providing the decoded image to a neural network. The degradation characteristic represents a mode of degradation and the consumption represents an amount of degradation.

18 Claims, 11 Drawing Sheets

Related U.S. Application Data

(60) Provisional application No. 62/792,316, filed on Jan. 14, 2019, provisional application No. 62/640,591, filed on Mar. 9, 2018.

(51) Int. Cl.
  *G06N 5/04* (2023.01)
  *G06T 11/20* (2006.01)

(52) U.S. Cl.
  CPC .................. *G06T 2207/20084* (2013.01); *G06T 2210/12* (2013.01)

(58) Field of Classification Search
  CPC ........... G06T 11/20; G06T 2207/20081; G06T 2207/20084; G06T 2207/30164; G06T 2210/12; G06T 7/0004
  See application file for complete search history.

(56) References Cited

U.S. PATENT DOCUMENTS

| | | | |
|---|---|---|---|
| 7,707,009 B2 | 4/2010 | Steinke | |
| 7,844,426 B2 | 11/2010 | Huang | |
| 8,589,124 B2 | 11/2013 | Huang | |
| 9,482,055 B2 | 11/2016 | Huang | |
| 10,635,081 B2 | 4/2020 | Nakahama | |
| 10,708,216 B1 | 7/2020 | Rao | |
| 11,125,022 B2 | 9/2021 | Potash | |
| 2009/0152005 A1 | 6/2009 | Chapman | |
| 2010/0051352 A1* | 3/2010 | Prevost | E21B 10/573 175/431 |
| 2010/0089649 A1* | 4/2010 | Welch | E21B 10/56 175/378 |
| 2010/0089658 A1* | 4/2010 | Welch | E21B 10/55 76/108.4 |
| 2010/0089661 A1* | 4/2010 | Welch | E21B 10/43 175/428 |
| 2010/0089664 A1* | 4/2010 | Welch | E21B 10/43 175/428 |
| 2010/0122848 A1* | 5/2010 | McClain | E21B 10/54 175/428 |
| 2010/0139975 A1* | 6/2010 | Teodorescu | E21B 12/02 175/39 |
| 2010/0139987 A1* | 6/2010 | Hunt | E21B 12/02 175/369 |
| 2010/0175929 A1* | 7/2010 | Schwefe | E21B 10/55 175/431 |
| 2010/0312370 A1 | 12/2010 | Lind | |
| 2012/0152617 A1* | 6/2012 | Hunt | E21B 10/00 29/407.01 |
| 2013/0214799 A1* | 8/2013 | Bellin | G01N 27/22 324/686 |
| 2013/0297231 A1 | 11/2013 | Puzz et al. | |
| 2014/0069726 A1* | 3/2014 | Mumma | B24D 18/0009 51/309 |
| 2014/0254865 A1 | 9/2014 | Soubra | |
| 2014/0332286 A1* | 11/2014 | Murdock | B24D 99/005 175/432 |
| 2016/0042310 A1 | 2/2016 | Yanez Mendez | |
| 2016/0203525 A1 | 7/2016 | Hara et al. | |
| 2016/0229006 A1 | 8/2016 | Smith | |
| 2016/0290906 A1 | 10/2016 | Rancic | |
| 2016/0342916 A1 | 11/2016 | Arceneaux | |
| 2017/0030181 A1 | 2/2017 | Thomas | |
| 2017/0057039 A1 | 3/2017 | Nakayama | |
| 2017/0154425 A1 | 6/2017 | Pierce et al. | |
| 2018/0002039 A1 | 1/2018 | Finn | |
| 2018/0119535 A1 | 5/2018 | Shen | |
| 2018/0130222 A1 | 5/2018 | Tafazoli Bilandi | |
| 2018/0179880 A1 | 6/2018 | Sankaran | |
| 2018/0340410 A1* | 11/2018 | Rivera-Rios | E21B 47/06 |
| 2019/0258222 A1 | 8/2019 | Karandikar | |
| 2019/0279356 A1 | 9/2019 | Kuwertz | |
| 2020/0051237 A1 | 2/2020 | Spivey | |
| 2021/0174486 A1 | 6/2021 | Chowhan | |
| 2021/0363833 A1 | 11/2021 | Potash | |

FOREIGN PATENT DOCUMENTS

| | | |
|---|---|---|
| CN | 104453789 A | 3/2015 |
| JP | H11267949 A | 10/1999 |
| WO | 2018033549 A1 | 2/2018 |

OTHER PUBLICATIONS

Zhang et al., "Research on wear degree recognition of picks based on multi-feature information fusion", Journal of Electronic Measurement and Instrumentation, 2017, 12, 10 pages.

* cited by examiner

WT – Worn Cutter

CT – Chipped Cutter

BT – Broken Cutter

SP – Spalled Cutter

DL – Delaminated

BF – Bond Failure

LT – Lost Cutter

SYSTEM FOR CHARACTERIZING OILFIELD TOOLS

CROSS-REFERENCE TO RELATED CASES

This application is a continuation of U.S. patent application Ser. No. 16/294,983 filed on Mar. 7, 2019, which claims the benefit of, and priority to, U.S. Patent Application No. 62/640,591 filed Mar. 9, 2018, and to U.S. Patent Application No. 62/792,316 filed Jan. 14, 2019, which applications are expressly incorporated herein by this reference.

BACKGROUND

When tools are used, e.g., in the oilfield, they are subject to degradation through use over time. For example, edges on cutting elements and threads can be worn or damaged through normal use. The tool degradation may not be uniform, however, and the rate at which a tool or parts thereof degrade, as well as the type of degradation, may vary depending on a variety of factors. Such factors can include the type of tool, the material that the tool is used to mill or cut (e.g., for drilling/milling/reaming tools), depth, temperature, pressure, fluid, drilling parameters, torque loads, impact loading, etc. Accordingly, the tools are periodically evaluated for deterioration, and, in response, parts are replaced or repaired as needed.

SUMMARY

Some embodiments of the disclosure include a method including receiving an image of a tool including a consumable object from a remote device via a network at a processor, decoding the image to identify the consumable object, using the processor, and determining a degradation characteristic, a consumption value, or both for the consumable object by providing the decoded image to a neural network. The degradation characteristic may represent a mode of degradation and the consumption value may represent an amount of degradation.

In the same or other embodiments of the disclosure, a system for characterizing degradation of a tool includes a remote device configured to capture an image of one or more consumable objects of the tool, and a processor configured to perform operations by executing instructions contained on one or more storage-type computer-readable media. The operations include receiving the image of the one or more consumable objects of the tool from the remote device, decoding the image to identify the one or more consumable objects, and determining a degradation mode characteristic, a consumption value, or both for the one or more consumable objects by providing the decoded image to a neural network.

In the same or other embodiments of the disclosure, a storage-type computer readable medium stores instructions that, when executed by at least one processor of a computing system, causes the computing system to perform operations. The operations include receiving an image of a tool comprising a consumable object from a remote device via a network at a processor, decoding the image to identify the consumable object, using the processor, and determining a degradation characteristic, a consumption value, or both for the consumable object by providing the decoded image to a neural network. The degradation characteristic may represent a mode of degradation and the consumption value may represent an amount of degradation.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

So that the recited features may be understood in detail, a more particular description, briefly summarized above, may be had by reference to one or more embodiments, some of which are illustrated in the appended drawings. It is to be noted, however, that the appended drawings are illustrative embodiments, and are, therefore, not to be considered limiting of its scope. Moreover, the drawings should be generally considered to be to scale for some embodiments, but the scale thereof is not limiting as other embodiments contemplated herein may have various scales or respective dimensions.

DETAILED DESCRIPTION

Embodiments of the present disclosure provide a system and method for automatically characterizing degradation in a tool, such as an oilfield tool. An illustrative example of an oilfield tool that may be evaluated using this process is a drill bit that includes several cutting elements (referred to herein as cutters); however, it will be appreciated that many different types of tools (e.g., threaded pipes, tubulars, or other tools; vibration tools, steering tools, etc.) may admit to successful application of the present system and associated processes. The systems and methods disclosed herein, in some embodiments, may avoid the subjectivity of the degradation evaluation process.

For instance, product analysis may be based on human observation and thus human resource capacity. When performed manually, such a process is an expensive and time-consuming endeavor. Furthermore, evaluation can be inconsistent. Even when metrics are provided for quantifying degradation, the application of these metrics may be subjective, and may vary according to the care, precision, and expertise brought to bear by the human doing the evaluation. Furthermore, where the results of such evaluation are captured manually, the manual data capture is time-consuming, especially with products that have complex deterioration-prone geometries.

The systems and methods of the present disclosure improve degradation evaluation processes by employing a trained neural network to undertake the analysis. The training corpus of the neural network may be established a priori by one or more trained experts, and the neural network may receive feedback on its predictions in order to further enhance accuracy when deployed.

Accordingly, at a high level, when the systems and methods of the present disclosure are employed, a field operator may take a picture (or set of pictures) or video of a cutting tool (e.g., drill bit, mill, reamer, etc.) or other tool using any suitable type of image-capturing device, e.g., a smartphone, which may be employed to generate an image file (still image(s), video(s), or both). The image file may be uploaded to a remote storage that may be accessible to a processor. In turn, the processor may decode the image, identify the consumable objects of the type of tool (e.g., on a drill bit, the cutters), and employ the neural network to classify and quantify the degradation of the tool. The processor may store such information in a database in association with a variety of relevant metrics, which may aid in establishing patterns of degradation. Such patterns may, in turn, inform recommendations for tool use and/or design, maintenance specifications, lifecycle analysis, etc.

Figure 1:
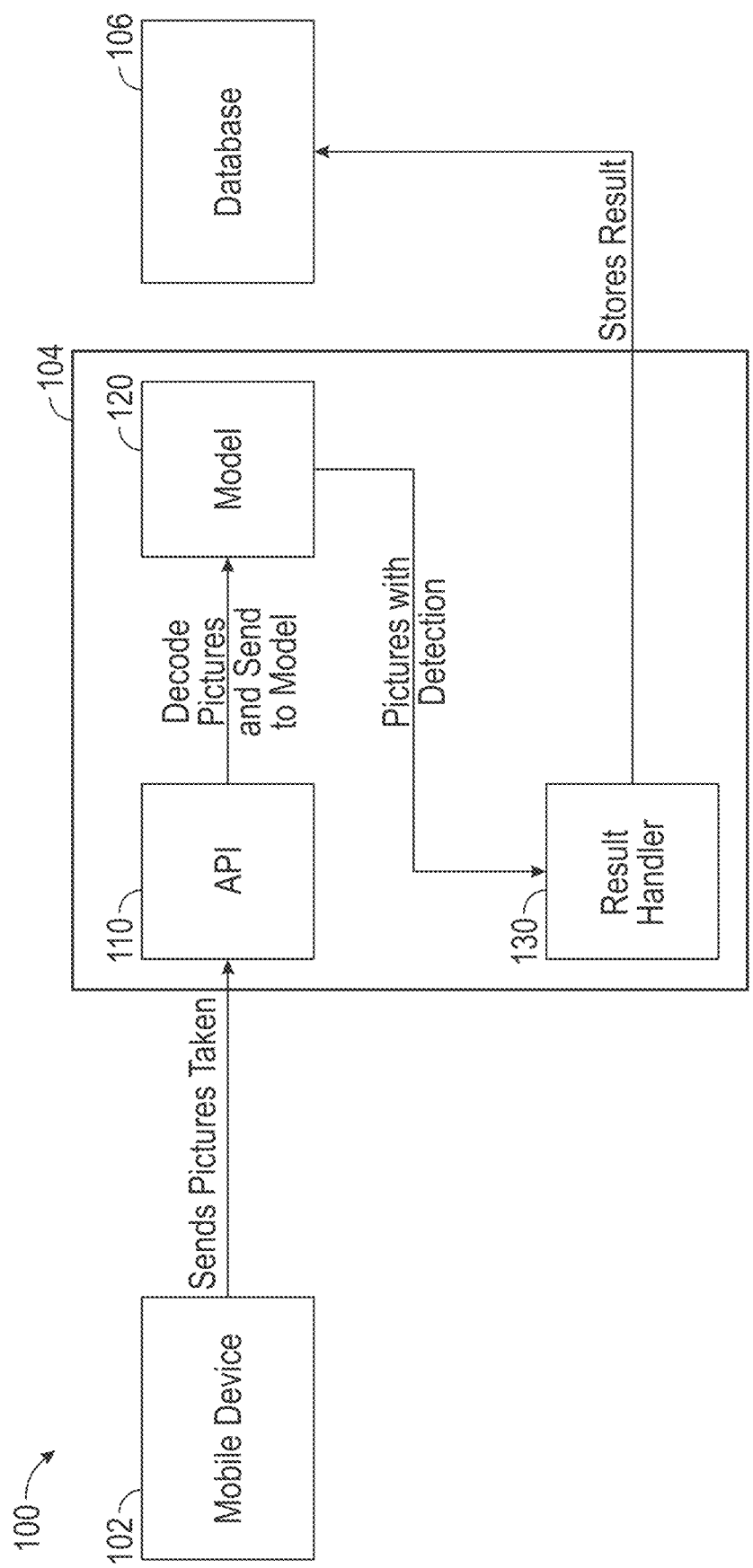
FIG. 1 is a schematic view of a system for characterizing wear in a tool, according to an embodiment.

Referring now to FIG. 1, there is shown a conceptual view of a system 100 for characterizing object degradation in an oilfield tool, according to an embodiment. Again, as mentioned above, for purposes of illustration, the system 100 is described herein as applied to a drill bit including a plurality of cutters. Such application is not to be considered limiting, unless otherwise expressly stated herein.

The system 100 may include an image-capture device 102, a processor 104, and a database 106. The device 102 may be any suitable type of device that is able to capture images, or to have images loaded thereon. The device 102 may be deployed in the field, and may thus be considered mobile and/or remote (e.g., with respect to the processor 104). In some embodiments, the device 102 may include two or more connected devices (e.g., one that acquires images and another that stores, processes, and/or transmits the images). Accordingly, the device 102, or another device that is connectable or otherwise able to transfer data to the device 102, may be configured to capture an image or video (which can generally be considered as multiple images) of the drill bit. For example, the device 102 may be or include one or more smartphones, tablet computers, laptop computers, digital cameras, peripherals tethered, wired or wirelessly, to a desktop computer, or the like. Although the term "mobile" is used in the present description, it will be appreciated that the device 102 may be a stationary device that is remote from the processor, e.g., deployed into the field, onto which image data may be loaded or otherwise captured.

The device 102 may be in communication with the processor 104, e.g., via a network such as the Internet or any other local area or wide area network. The device 102 may upload the images captured or otherwise stored thereon to a memory system (e.g., flash drive, hard disk drive, or a remote storage (e.g., "cloud") that is accessible to the processor 104) of the processor 104.

Figure 2A:
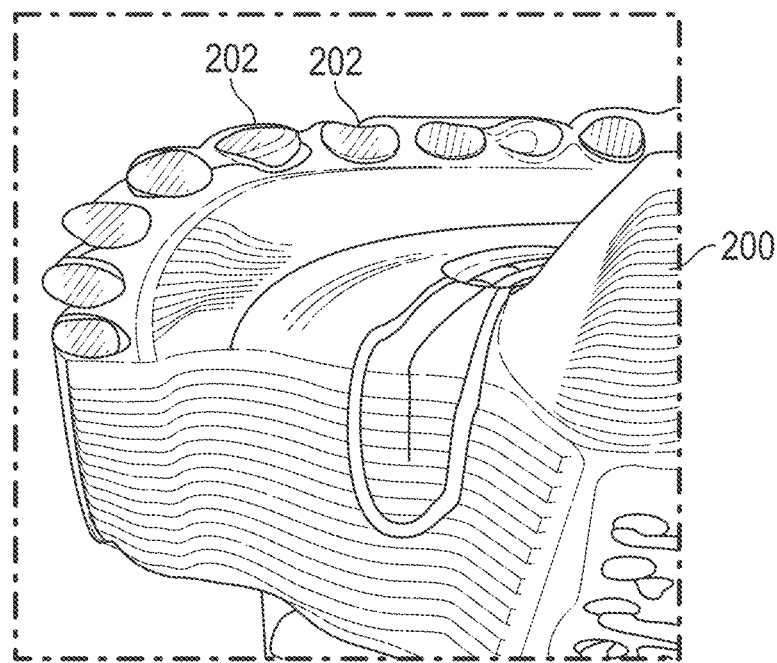
FIGS. 2A and 2B illustrate a drill bit with consumable cutting elements, according to an embodiment. In particular, in FIG. 2B, the cutting elements are identified with bounding boxes applied thereto, in accordance with some embodiments disclosed herein.
Figure 2B:
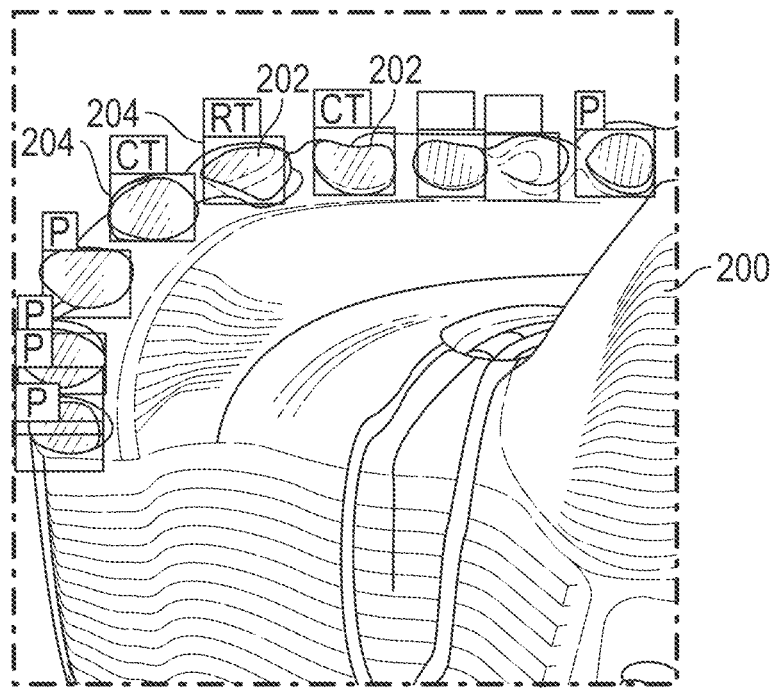

The processor 104 may include an application-program interface (API) 110, which may include function(s) and executable program(s) that allow the processor 104 to decode the images (e.g., image processing). In the case of a video being uploaded, the API 110 may be configured to enable the processor 104 to extract one, some, or all of the individual images that make up the video and evaluate the individual images. FIGS. 2A and 2B illustrate an example of such decoding. In particular, as shown in FIG. 2A, an image of a tool 200, such as a drill bit may be provided. The tool 200 may include several cutters 202, which optionally have varying degrees of and/or modes of degradation, as mentioned above, depending on a host of factors, including the health of the tool 200 itself. As shown in FIG. 2B, the processor 104 may use the API 110 to decode the image, e.g., by identifying the cutters 202 using any suitable object-recognition technique. In an example object-recognition technique, the color and/or shape of the cutters 202 may be used for recognition. In the same or other embodiments, a CAD or other virtual model of the drill bit may be used in combination with the images to identify the cutters 202. In still other embodiments, other object-recognition techniques may be used. In recognizing the cutters 202, the API 110 may position bounding boxes 204 on each of the recognized cutters 202. The bounding boxes 204 may be virtual boxes applied invisibly to a user of the system 100, or may be visible (e.g., displayed to the user, such as by overlapping an image). The bounding boxes 204 may be coded with degradation mode characteristics and/or consumption amounts of the respective cutters 202, as shown, and as will be described in greater detail herein. The body of the tool may also have a bounding box applied thereto, and analysis may be applied to the body of the tool as well as or instead of the cutters (e.g., to recognize and characterize erosion or wear of the body, cracks in the body, etc.).

Returning to FIG. 1, the decoded images, e.g., with the bounding boxes applied thereto, may then be received into a model 120 (e.g., a modeling module), which may employ deep-convolution neural networks. In an embodiment, the deep convolutional neural networks are used to develop an algorithm for predicting what an expert user's conclusion regarding a degradation characteristic and consumption value for the individual cutters would have been based on a training corpus of images with established conclusions.

Suitable neural network machine learning algorithms include, by way of non-limiting example, feed-forward neural networks, recurrent neural networks, long-short term memory neural networks, and convolutional neural networks. These examples of neural network machine learning algorithms share similar multi-level configurations. By way of example, the neural network architecture in a specific embodiment may be based on inception module with dimension reduction which includes convolutional layers of different sizes followed by max pooling layers, dropout layer, fully connection layer and a softmax layer. The modeling of the neural network may performed as a directed acyclic graph (DAG) using tensorflow. Graphical processing units (GPU) instances may be used for computational efficiency.

In many cases, the network includes an "input layer" of nodes equal to the size of the input types, one or more "hidden layers" of nodes, and a final "output layer" of nodes equal in size to the input layer. The hidden layers include weight matrices and bias vectors that are updated during the training process by observing the characteristics of the cutter. The hidden layers, by design, may not have the capacity to store or reproduce exactly what was presented in the input. Instead, they abstract and capture generalized properties of the input object image. At an extremely high level, it is the responsibility of the hidden layers, per the learning algorithm chosen, to be provided an image and predict a wear characteristic or consumption. This predictive capability (generally, predicting the conclusion of an expert) is accumulated by observing the experts' characterization of the objects in the images of the training corpus. That is, it constructs a probabilistic model where, given a specific member of the images (in the input layer), it can predict the characteristic wear and/or consumption (in the output layer). When processing elements, the internal structure of the network is updating to reinforce and/or forget its predictive pathways.

Deep learning models have a tremendous capacity to learn object properties, provided they are given sufficient, reliable context (that is, consistent images to analyze and compare), and a sufficient quantity of training examples (often in the thousands or more) to reliably establish a high degree of confidence in convergence at a conclusion.

Once the neural network model 120 has been applied and used to determine a degradation characteristic and consumption value, the results are sent to a result handler 130 of the processor 104. The result handler 130 may communicate with the database 106, as shown, which may be local or remote to the processor 104. The result handler 130 may store associations in the database. For example, the cutter and/or tool may be identified in the database 106, e.g., using an identifier number. The cutter and/or tool operating conditions (e.g., the environment in which it was used, including drilling parameters, geology, equipment type, etc.) may also be stored, along with the cutter wear characteristics and consumption. Various other historical data related to the tools is also stored in some embodiments. For example, in some embodiments, the code for a tool/cutter is associated with a cutter history (e.g., orientation angle, repair cycles, when the cutter is de-brazed, rotated, and re-brazed in a new orientation, verification of cutter orientation meeting repair specifications, etc.). Further, part usage history, dull condition, maintenance performed, and the like may be recorded/stored. This may allow the result handler 130 to make recommendations. Example recommendations may include identifying the remaining life of the cutter and/or tool for further use, recommendations to rotate the cutter to expose a portion of an edge that has no (or less) degradation, recommendations on positioning of the cutter in a given tool (e.g., the tool tends to chip cutters when placed in a certain position, and since a given cutter is already chipped, it may be advantageous to place another cutter in this position), recommendations for a type of cutting element replacement (e.g., a higher or lower quality cutting element based on respective high or low wear), recommendations for adjusting the operating conditions/parameters of the tool, other recommendations, or combinations of the foregoing. Further, this data may be used to determine degradation patterns or trends, which may be used by tool designers to refine designs or implement new designs, as explained in greater detail herein.

Figure 3A:
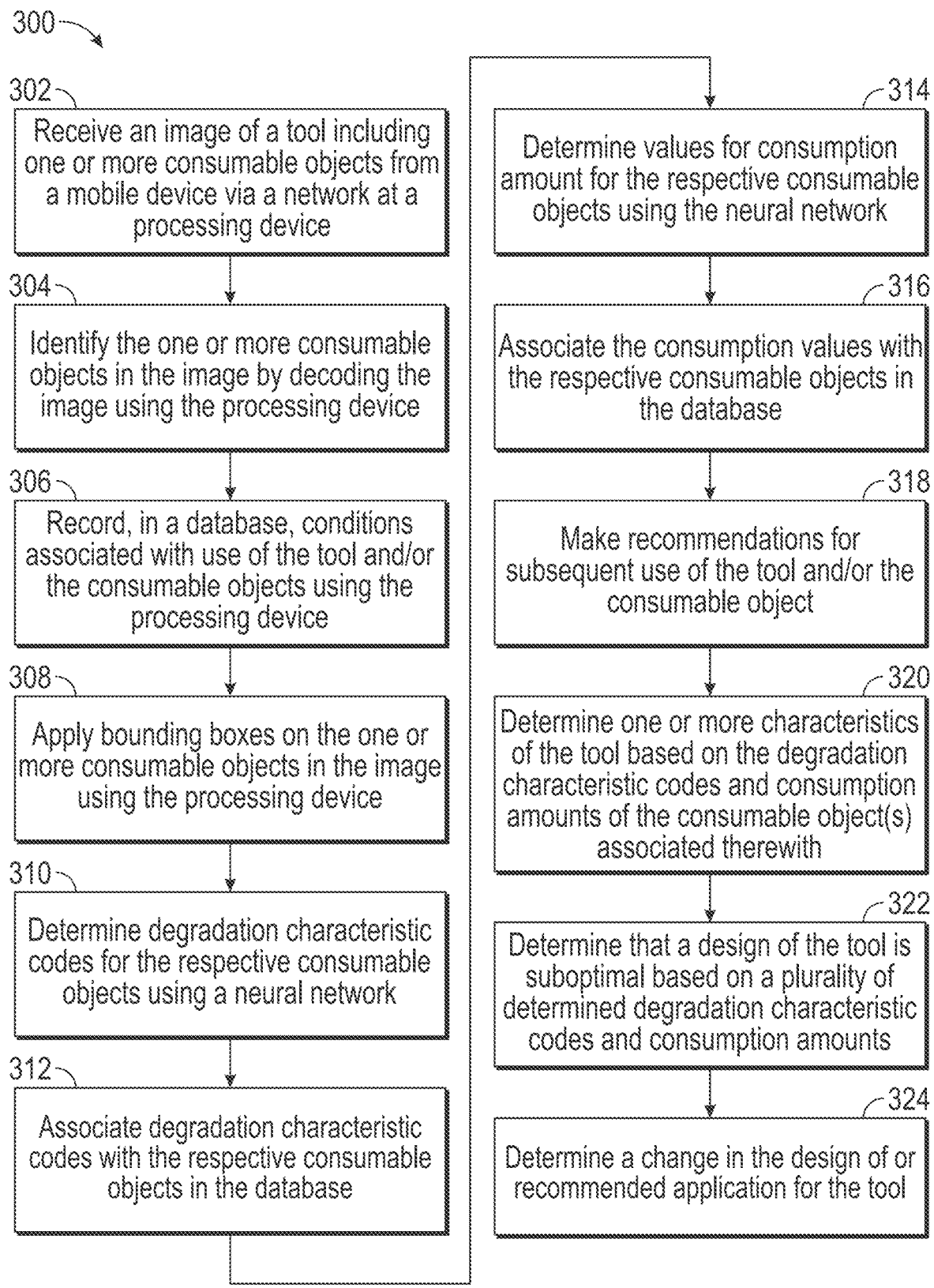
FIG. 3A is a flowchart of a method for characterizing wear in a tool, according to an embodiment.

With continuing reference to FIG. 1, a flowchart of a method 300 is shown in FIG. 3A for characterizing degradation in a tool, according to an embodiment. It will be appreciated that the following workflow is merely an example, and the various actions may be taken in any order, simultaneously. Further, some of the actions may be combined into a single action, while others may be divided into two or more actions. In addition, certain embodiments of the method 300 may be executed by an implementation of the system 100 of FIG. 1, but other embodiments may employ other systems, consistent with the present disclosure.

The method 300 may include receiving an image (potentially multiple still images or a video which can be considered as multiple images) from the mobile (or another, e.g., remote) device 102 via a network at the processor 104, as at 302. The device 102 may, for example, capture an image (e.g., take a picture) or series of images (e.g., capture a video stream) and upload the image(s) to an accessible storage location for the processor 104 to use. The image may be captured in response to guidance received from the processor 104 or a program that is local to the device 102, e.g., instructing the user as to angles, lighting, background, etc. for capturing images and of what objects. Accordingly, the images may be captured by a human user operating the device 102. In another embodiment, the images are captured by an automated device, such as a robotic arm configured to control the position of the device 102. For example, the automated device may be programmed based on a product's design specifications to execute a scripted image-capture routine. Further, the device 102 may be configured to interact with the product to read and/or detect physical attributes to adjust camera location, orientation, and trajectory during the image capture at 302.

In some embodiments, the device 102 is locked in a specific mode suited for the type of images being captured (e.g., torch and portrait mode, which may control the lighting conditions and prevent the screen from accidentally moving to landscape mode). Further, in embodiments in which a video is captured, the method 300 may provide a predetermined length of time for the video (e.g., 5, seconds, 10 seconds, 30 seconds, 2 minutes, etc.), which may enforce a basic level of standardization of the videos for subsequent processing. In some embodiments, the length of time may be adjustable (e.g., on-the-fly by a user).

The method 300 may then include identifying one or more consumable objects of the tool using the processor 104, as at 304. For example, the processor 104 may identify cutters in the case of the tool being a drill bit, mill, or reamer. The method 300 may also be used or modified to allow use with other components and consumable objects in a wide variety of downhole or other environments. Application of embodiments of the present disclosure should not, therefore be limited to downhole cutting tools or even downhole tools, but may be extended to other industries and tools or components. For example, other consumable objects that may be evaluated using embodiments of the present disclosure include: bearings/bushings; threads; coated surfaces; cutting elements (e.g., tungsten carbide inserts, diamond cutters, drill bit blades, saw blades, CNC tools, turning tools, mill teeth, etc.); gauge protectors; hole opening or reaming elements; steering pads/pistons; stabilizing or centralizer blades or pads; contact surfaces; wear pads; pump components (e.g., swash plates, rods, etc.); screens (e.g., shaker screen or debris screen); rotors or stators; slips (e.g., anchor slips, iron roughneck slips); drill pipe or casing; seals; blow out preventer rotating assemblies; wear rings/sleeves; pins or lugs; dies; J-slot tracks; valves; manifolds; gears; clamp faces or jaws; splined shafts; filters; whipstocks; turbine blades; nozzles; tubing hangers; road picks; wellheads; sleeves with flow ports; wireline winch; tubing junctions; or any component or surface where physical degradation (e.g., wear, erosion, fatigue, etc.) can limit tool life or reusability. Although not limiting of the present disclosure, any component where material is selected on the basis of reducing wear or erosion (e.g., diamond, tungsten carbide, tool steel, etc.), or that is that is treated to reduce wear or erosion (e.g., using hardfacing, wear resistant or friction reducing coatings, laser cladding, etc.), or the like, may be evaluated using methods of the present disclosure.

In an embodiment, the image-capturing process may employ photogrammetry to digitally map the contours of a drill bit, cutter, or another consumable object of the tool. In particular, the dull grading system (e.g., FIG. 5) may be digitized and automatically determined based on measurements generated during such photogrammetry processing. In addition, the photogrammetry may employ differences between pre-use measurements and post-use measurements of the consumable object. This may be used, for example, both for determining wear amount and wear mode/type.

In an embodiment, the image capturing process may also include recognizing a code or identifier on the tool or component, which may indicate a particular tool (e.g., as with a serial number) and/or the type of tool (e.g., as with a model number). Such code recognition may employ alphanumeric optical character recognition, bar codes, quick-response (QR) or other type of matrix codes, bar codes, etc. Image-recognition or laser scanning, for example, may be employed to read the codes. Radiofrequency (RF) or other types of code storage/transmission devices or protocols may also be associated with the images of the tool, e.g., in the database 106.

Figure 3B:
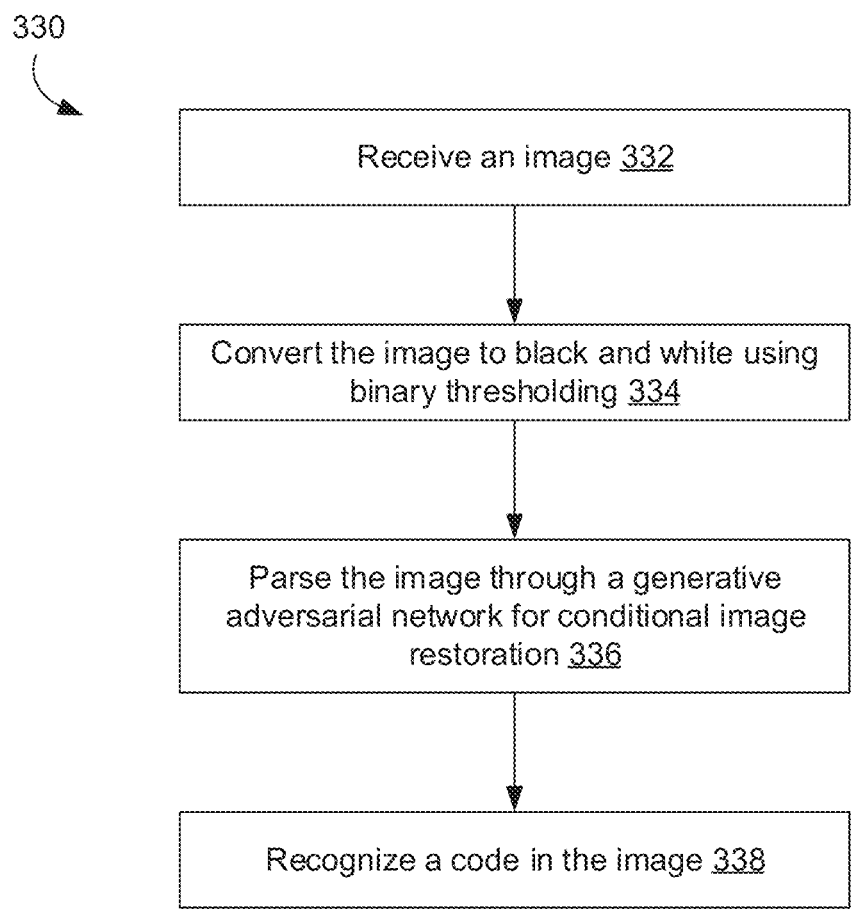
FIG. 3B is a flowchart of a code-recognition process for use with embodiments of the present disclosure.

FIG. 3B illustrates a flowchart of a code-recognition process 330, according to an embodiment. The process 330 may, for example, be used as part of other methods described herein (e.g., within block 304 of the method 300 shown in FIG. 3A). Accordingly, the image-preparation process 330 may include receiving an image, as at 332, e.g., from any source, whether local or remote, via wireless or wired transmission, etc. The process 330 may then include converting the image to black and white using binary thresholding, as at 334. In an embodiment, Otsu's method may be employed to compute thresholding values that split a histogram into two halves for each channel thereof. Using Otsu's method, or the like, may return an image threshold object, which may be turned to black and white codes associated with the tool or component.

The process 330 may then parse the image through a generative adversarial network for conditional image restoration, as at 336. For example, the generative adversarial network may be based on Resnet for Conditional Image restoration. Thus, adversarial learning and reconstructing of the image may be employed, by deblurring, dehazing, and improving the resolution of the image. The process 330 may then recognize the code in the image, as at 338.

The method 300 optionally includes recording, e.g., in the database 106, conditions associated with the use of the consumable objects, e.g., using the processor 104, as at 306. Such conditions may include the operating environment in which the tool is used (e.g., rock properties, depth, pressure, depth, temperature, fluid type/presence, metal properties, etc.). The conditions may also include drilling parameters, such as weight on bit and rotation speed (RPMs), the type of drill string in which the tool is employed, etc. The conditions may further include the age of the tool or component, e.g., in absolute terms (e.g., feet drilled, hours of use, etc.) or as a percentage of a predetermined lifecycle. The conditions may further include the reason for pulling the tool from the bore in the case of tools that are deployed into a wellbore (e.g., drill bits, reamers, etc.). The conditions may be established or approximated using databases (e.g., collected during drilling of offset wellbores, surveying, or via simulation) that store information related to lithology, performance, engineering specifications, performance data, well log data, etc.

The method 300 may include applying bounding boxes (which can generally be any shape) on the one or more consumable objects in the image using the processor 104 (e.g., the API 110), as at 308. The bounding boxes may establish coordinates where the consumable objects can be found, and thus may partition the image into targets for analysis by the neural network model 120. In some embodiments, the bounding boxes may be color-coded for enhanced human viewability of the degradation mode characteristic(s) of the consumable objects identified therein. The API 110 may be used to establish the bounding boxes by providing suitable image recognition software. In some embodiments, a user may facilitate the identification of the consumable objects e.g., by inputting the type of tool or in some way indicating the wear prone objects in the image (e.g., by tapping on a screen at the location of the consumable objects).

Figure 3C:
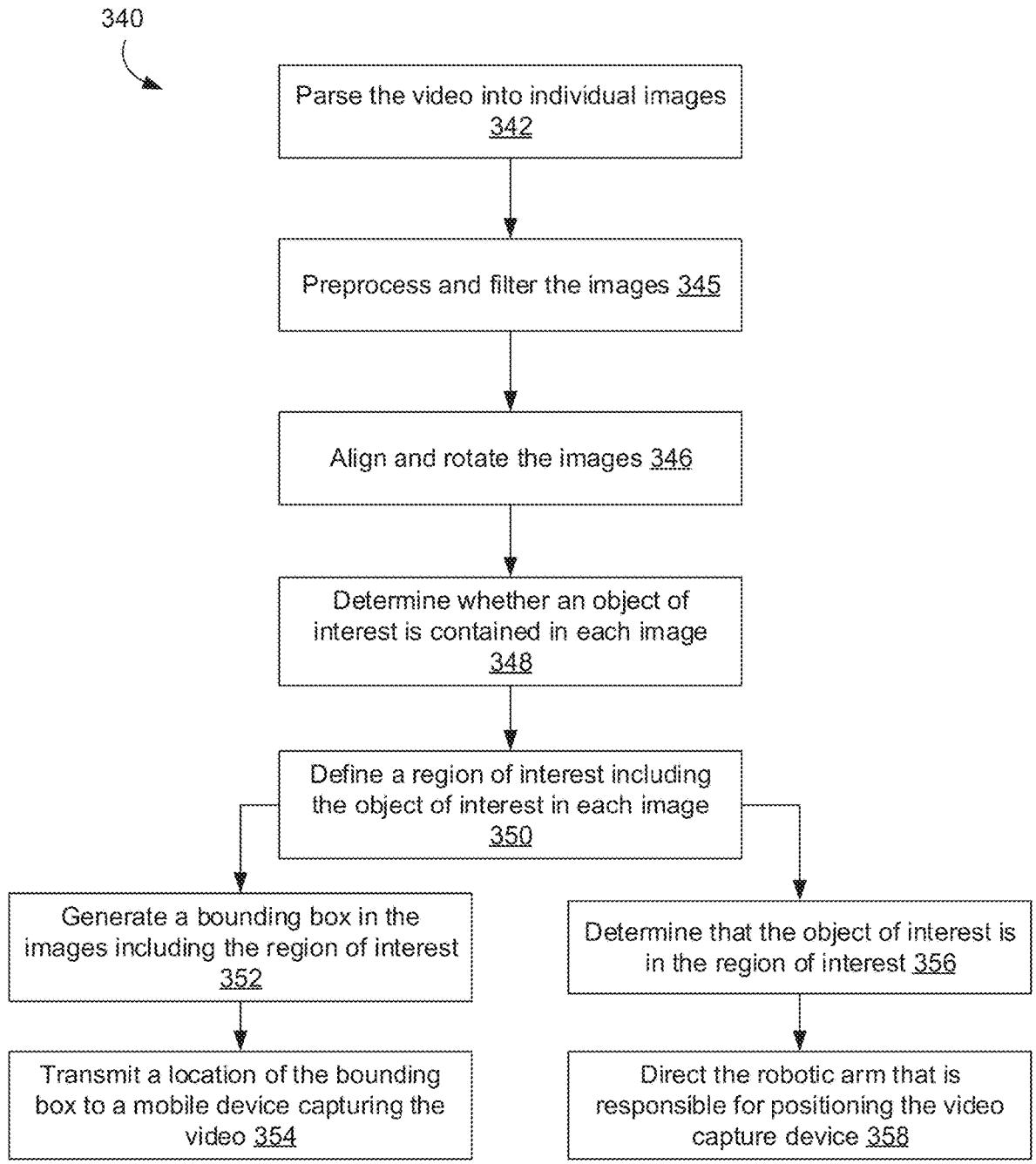
FIG. 3C is a flowchart of an image-acquisition process for use with embodiments of the present disclosure.

FIG. 3C illustrates a flowchart of a specific example of an image-capturing process 340, according to an embodiment. The process 340 may, for example, be used as part of one or more of blocks 302-308 of the method 300 shown in FIG. 3A. Accordingly, the process 340 may include parsing a series of images (e.g., a video) received from the image-capture device 102 (e.g., the images received at 302) into individual images, as at 342.

The process 340 may then proceed to preprocessing and filtering the images, as at 344. This may include any processing suitable to remove noise and subtract background information from the images.

The process 340 may also include aligning and rotating the images, as at 346. This may, for example, assure that the images are translational and rotationally invariant, or at least substantially so.

The process 340 may further include determining whether an object of interest (e.g., a cutter or drill bit) is contained in each image, as at 348. In some embodiments, this may be determined with the aid of the bill of materials (BOM) associated with a tool being imaged. For example, the BOM may include or reference specifications (e.g., size, shape, location, etc.) for the consumable objects that are to be analyzed. If an object of interest is in the image, the process 340 may define a region of interest (e.g., a bounding box) including the object of interest in the image, as at 340. Accordingly, this may allow for a "voting out" technique to be employed using the series of images (video) captured, in which images that show the object of interest more clearly, or otherwise are better suited for grading (as explained in more detail herein), are retained, while those that are determined less-suited for grading are removed from consideration.

Furthermore, the defined region of interest may be employed as a feedback loop to the device 102 being used to capture the images received at 302. Accordingly, in one example, a user may employ the device 102 (FIG. 1) to capture the video. In this example, the process 340 may include generating a bounding box in the images based on the location of the region of interest, as at 352. This bounding box, or at least location data corresponding to the region of interest, may then be transmitted to the device 102, as at 354, for display thereon, which may aid in a user accurately placing the object of interest within the bounding box, thereby facilitating accurate capture thereof.

In another example, a robotic arm or other automated device may be employed to position the video capture device. Accordingly, the process 340 may be configured to transmit information and/or commands to guide the image acquisition by the automated device. For example, the process 340 may determine that the object of interest is in the region of interest, as at 356. The process 340 may include directing the robotic arm (or another automated device) that is responsible for the positioning of the video capture device, as at 358. In an embodiment, such direction may include providing notification to the automated device that the video is properly placed. In another embodiment, such direction may include providing a direction, angle, distance, elevation, etc. to move the video capture device to the automated device. Such direction may be assisted by the BOM as well.

Referring again to FIG. 3A, the method 300 may move to determining the degradation characteristic of the respective, identified consumable objects, as at 310. The method 400 may accomplish this by feeding the decoded images, with the consumable objects identified, to a neural network (e.g., the model 120) that has been trained to classify and quantify the degradation of the consumable objects.

Figure 4A:
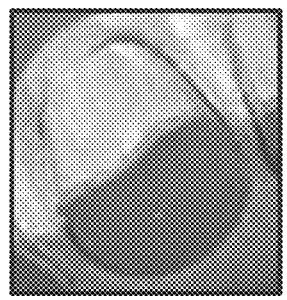
FIGS. 4A, 4B, 4C, 4D, 4E, 4F, and 4G illustrate different modes of degradation in a cutting element, according to illustrative embodiments.
Figure 4B:
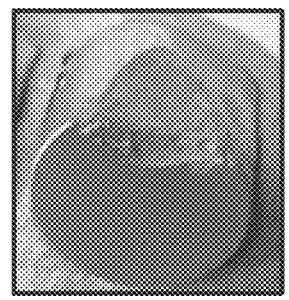
Figure 4C:
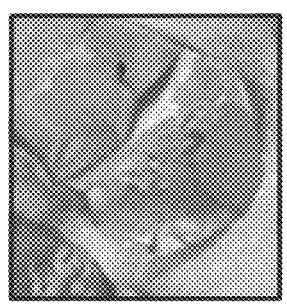
Figure 4D:
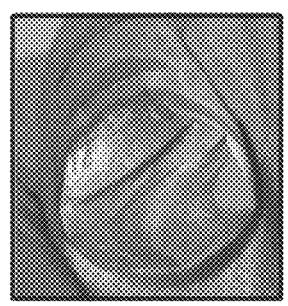
Figure 4E:
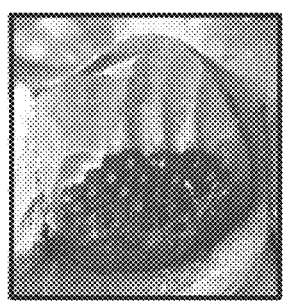
Figure 4F:
Figure 4G:
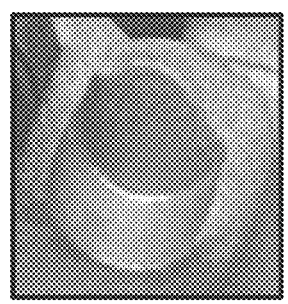

FIGS. 4A-4G illustrate several examples of different degradation characteristics of a cutter in a drill bit, which are labeled with the different codes and associated modes. In particular, FIG. 4A illustrates an example of a degraded cutter with a wear profile, which is referenced as a worn cutter (code WT). FIG. 4B illustrates an example degraded cutter with a chipped profile, which is referenced as a chipped cutter (code CT). FIG. 4C illustrates an example degraded cutter with a broken profile, which is referenced as a broken cutter (code BT). FIG. 4D illustrates an example degraded cutter with a spalled profile, which is referenced as a spalled cutter (code SP). FIG. 4E illustrates an example degraded cutter with a delaminated profile (e.g., cutting table delaminated from substrate), which is referenced as a delaminated cutter (code DL). FIG. 4F illustrates an example degraded cutter with a bond failure (e.g., failed braze joint), which is referenced as a bond failure (code BF). FIG. 4G illustrates an example cutter pocket missing a cutter, which is referenced as a lost cutter (code LT). IADC dull grading codes and types may be used in accordance with embodiments of this disclosure, and may include other coding such as erosion (ER), flat crested wear (FC), heat checking (HC), no characteristic (NO), rounded gauge (RG), or other primary degradation characteristics. Similar grading types and codes for the bit itself may include balled up (BU), cored (CU), junk damage (JD), lost nozzle (LN), plugged nozzle (PN), ring out (RO), or wash out (WO) bit profiles. Where a roller cone bit is graded, example additional grading may include broken cone (BC), cracked cone (CC), cone drag (CD), cone interference (CI), lost cone (LC), off-center wear (OC), pinched bit (PB, shirttale damage (SD), self-sharpening wear (SS), tracking (TR), or other degradation profiles and codes. Moreover, PDC cutter substrate condition, to the extent visible in the images, may be graded.

In various embodiments, the presence or absence of cracks may be determined under normal lighting or with the aid of dye-penetrant, fluorescent lighting, etc. Furthermore, a determination of the absence or presence of assembled component parts of the tool (e.g., missing/present cutters, missing/present nozzles, etc.) may be included as part of the grading process. Other types of grading may be employed for other types of tools, e.g., thread geometry and condition, or any other condition that can result from product operation which might impact product re-usability, repair instructions, or product reliability (actual or perceived), such as wear, erosion, abrasion, or corrosion in any location on the tool.

The method 300 may include associating the degradation characteristic codes in the database 106 with the consumable objects, as at 312. The consumable objects may thus, in some embodiments, have individual identifiers which may be tracked. In the same or other embodiments, the consumable objects may be tracked by reference to the tool in which they are deployed, with the tool metrics being maintained (e.g., tool number 1234 has a chipped cutter; increment cutter chipping counter for tool 1234 in the database 106).

Figure 5:
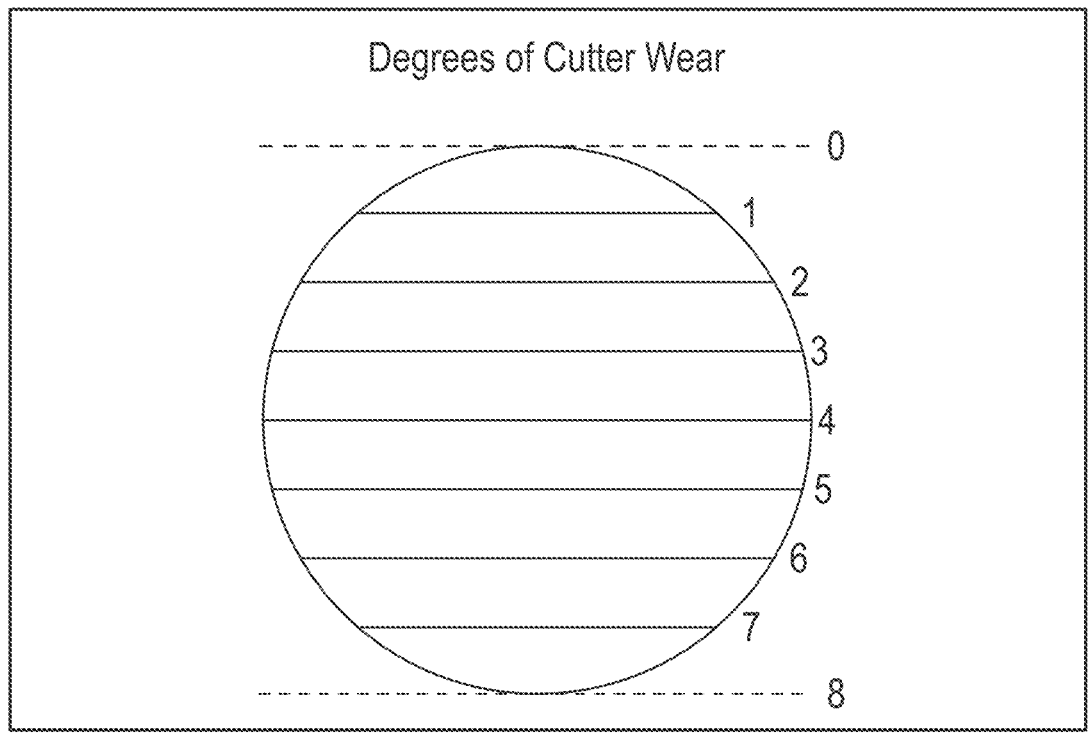
FIG. 5 illustrates a metric for identifying a consumption amount, according to an embodiment.

The method 300 may also include determining values for the consumption amount of the respective consumable objects using the neural network, as at 314. Such determination may also be satisfied by determining the converse, i.e., the amount of remaining material of the consumable object. The determination may be based at least in part on the type of degradation identified (i.e., the degradation characteristic), but in other embodiments, may be determined independently from the type of wear characteristic. FIG. 5 illustrates an example of one consumption value metric that could be applied. In this case, a number one through eight is given based on the amount of consumption. Thus, a consumable object with ¼ of the material worn away could have a "2" consumption metric, while a consumable object with ½ of the material worn away could have a "4" consumption metric, and a consumable object with ⅝ of the material worn away could have a "5" consumption metric. With drill bit cutters, this consumption metric be determined based on total size of the cutter, or based on how much of the cutter extends beyond a base of the drill bit, and thus is able to bite into the rock. In some embodiments, an average degradation value may be calculated for a tool based on a plurality of consumption amount values, e.g., a drill bit consumption value may be determined based on an average of the consumption amount values of a plurality of cutters.

The method 300 may proceed to associating the consumption amount values with the respective consumable objects (or the tools that carry the objects, as mentioned above) in the database 106, as at 316.

The method 300 optionally includes making recommendations as to the configuration and/or application of the tool, the consumable object, or both, as at 318. Recommendations may come from the neural network used to analyze the post-processed degradation condition data combined with the relevant factors which contributed to the dull condition. The relevant factors may be the drilling application, lithology, operating parameters, operating hours, design factors, material selection, etc. Such information may come from databases of offset well logs, core or other types of well data, geological surveys or other types of lithology databases, performance analysis, well plans, engineering system databases, simulations, design files, other sources, or combinations of the foregoing. These factors may then be compared by the neural network to similar situations, to unworn cutters, etc. to arrive at recommendations based on differences in the product and/or operating conditions that resulted in superior performance and reliability. Such recommendations can include application recommendations, such as formation/bit selection, drilling parameter (e.g., weight-on-bit and/or speed) selection, bottom hole patterns, impact loads, fluid distribution, drilling environment, temperature, etc. Such recommendations may also or instead provide design or tool configuration recommendations, such as the placement or type of cutters, or design changes related to cutting structure and tool body. Additional recommendations may include maintenance recommendations, such as what to do with existing cutters to repair the bit prior to reusing the bit (e.g., replace a cutter, rotate a cutter and re-attach the same cutter, use a different type of cutter during repair, etc.). Further, performance and reliability trends from similar products can be used to predict when a component is likely to fail prior to drive decisions to replace and avoid a failure during operation. Trends in a component's typical failure modes can drive and enhance component development. Component and product selection can result in performance, reliability, and cost reduction.

For example, one of the users of the data derived by the use of this system may be bit-cutting structure design engineers who may look at dull bit evaluations for multiple runs of the same product used in comparable applications to design a new bit to enhance performance and/or increase durability. In some embodiments, rather than manual, subjective review by the design engineer, embodiments of the present disclosure improve the design by automating the review in an objective way that increases the speed and consistency of the design improvements and design systems. Another user may be a cutter manufacturer who may develop new cutters based on the typical cutter failure mode of a target cutter family. For example, a cutter may be used in various applications around the world, and based on hundreds or thousands or cutter dull condition evaluations, delaminations may be determined to occur a certain percentage of the time. If this percentage is determined to be too high, a new cutter might be developed and tested to reduce the potential for delamination. Results can be measured based on bit images analyzed.

Accordingly, the method 300 may include determining that a design or configuration of the tool is suboptimal based on a plurality of determined degradation characteristic codes and consumption amounts, as at 322. As the term is used herein, "suboptimal" means that a change in design, configuration, or use is recommended. For example, a plurality of tools of a particular design may be imaged, and then observed by the neural network. The neural network may provide the degradation characteristic codes and consumption values for these tools, and, over time, a pattern of degradation (or lack thereof) may develop. For example, a cutter of a particular material specification in a particular location may frequently be chipped in a particular downhole application. Thus, for future uses of the tool in such applications, a different cutter design or material specification may be prescribed. This may provide greater granularity for tool designs, as it may provide different recommended cutters within a given tool, e.g., depending on the drilling parameters and/or application conditions. In addition, if a cutter in a particular location sees very little wear, a less expensive cutter type or material specification may be employed, thereby increasing cost efficiency.

The method 300 may further include determining a change in the design of or recommended application for the tool, as at 324. It will be appreciated that a variety of such analyses and conclusions may be arrived upon by maintaining a history of the results from the neural network. Furthermore, the use of such a neural network may achieve an objective determination across that history, providing reliable analytics from which to make recommendations. Determining a change in design may include determining a change in the design of a future, similar bit (e.g., a future bit should have a cutter at a different position or angle, or use a different type of cutter) or determining a change in the current bit (e.g., during bit repair, a cutter should be rotated or replaced).

In some embodiments, at least some of the results of the analysis may be sent to the device 102 via the network. The results may be visual, as shown in FIG. 2B, illustrating the wear characteristic and/or consumption value in the bounding boxes, although a variety of different manners to display the result will be readily apparent based on the present disclosure. Further, the method 300 may include transmitting the determined recommendations via the network back to the device 102 (e.g., for implementation by the field user to remove, replace, or reposition a cutter in a drill bit or take similar actions, or refrain from such actions, in the case that the consumable object is still suitable for use in its current position, with respect to another type of consumable object or another type of tool).

In some embodiments, the results of the analysis may be used to affect a bill of materials for the tool or a system that employs the tool. This may be considered a "smart" bill of materials (smart BOM). Briefly, a product's BOM defines the parts and components that makeup the finished product. Therefore, the data contained in the BOM is relevant to the asset and can be used to help identify and correlate images captured from the new or used asset. For example, in a PDC bit, the product BOM contains the PDC cutters, identified by part number and quantity, assembled into the bit. One PDC bit may utilize more than one PDC cutter part.

The product's BOM can be enhanced or made "smart" to designate and communicate the specific location on the bit where each cutter part number is to be assembled. For instance, individual serial numbers of similar parts can be associated with specific locations on the assembled bit. When an image is captured of a cutter on a bit (e.g., at 302 in FIG. 3A), the analytics software can access this BOM information to cross-reference the image to a specific part and serial number for each cutter. That information can be associated or tagged to the image file for later use in identification and analysis.

Moreover, to dig deeper into the diagnostic report, the user can chat with an artificial intelligence (AI) bot, serving as a human-machine interface for the processor 104. By interaction with the AI bot, the user may present further queries and enhance the initial reports through a question and answer session. The AI bot may be trained with information regarding the past usage parameters for the drill bits, the recommended maintenance manuals, the drilling history, etc.

The AI bot framework may be developed using word vectors and natural language understanding. Queries from the user are classified by intents by extracting content from query called entities. An entity recognition system may be trained with a multitude of vocabulary from any suitable library source. The probability of occurrence of a group of entities in a query help intent classification of a user query. This enables the bot to understand what the user intended from an input character string or voice query. The bot retrieves a probable answer from the knowledge repository. The session may maintains a history of past conversations, enabling a constructive dialogue between the user and the bot. The bot may also be trained with word vectors to enhance dialogue generation. In some embodiments, the bot can also understand visual cues from the user in the form of images, other visual data files, etc.

The method 300 may also include determining one or more characteristics of the tool based on the characteristics of the consumable object(s) thereof, as at 320. For example, as mentioned above, a particular tool may have poor wear results, while another has relatively good wear results, in a particular drilling environment, drill string, rig type, drilling parameters, etc. Further, certain tools may tend to wear or damage one consumable object, among an array on the tool, faster than others, and thus rotating sequences for the consumable objects may be determined and employed to extend the life of the array of wear-prone tools.

The recommendations made at 318 and/or 324 may, as discussed above, be made at least partially based on the mode of wear/damage (see, e.g., FIGS. 4A-4G showing different example wear modes). Continuing with this example, the recommendations at 318 and/or 324 may follow a decision tree or by implementation of an AI system in order to make recommendations that are the same as or similar to those that might be made by an expert, except that rules are applied so the recommendation is consistent and repeatable, rather than left to the subjective determination of human experts. By identifying the type and damage of each cutting element, for example, the system can also make a repair recommendation specific to each cutter type. The recommendations may include changes such as changing the type of cutting element (e.g., deeper leached cutting element to reduce wear flat, larger diamond grain diamond table for impact damage/chipping, different bevel size to change aggressiveness, etc.). The recommendations may also include changes to the aggressiveness or position of the cutter by attaching a new modular segment to the blade, as will be described in greater detail below.

Such an analysis may proceed, for example, beginning with a "general" recommendation that applies across the wear mode, followed by a specific recommendation that may apply to different cases within a particular wear mode. Additionally, it is possible to make recommendations for cutting elements that do not show appreciable damage. For instance, if cutting elements are not wearing, they may not be cutting with their maximum efficiency. So recommendations may be made to fix unworn cutters as well, or to replace the type of cutting element with a lower quality cutting element.

Examples of recommendations that can be made are reflected below in Table 1. It should be understood that Table 1 is merely illustrative of recommendations, and other or different recommendations may be made as either a general recommendation or specific recommendation.

TABLE 1

| Wear mode | General Recommendation | Specific Recommendation |
|---|---|---|
| Worn Cutter | Use a more wear resistant cutter | Deeper leached cutter<br>Cutter with smaller diamond grain in the diamond table<br>Use a rolling cutter that wears over the entire surface, rather than at a point<br>Increase back rake angle (more negative)* |
| Chipped Cutter | Use a more impact resistant cutter | Use a cutter with a bigger bevel to make the cutter less aggressive<br>Use a cutter with a larger diamond grain in the diamond table<br>Use a cutter with increased impact resistance (e.g., a conical or ridged cutting element that cuts over a larger area, and is less point loaded, and can be less aggressive)<br>Add a back-up cutter or depth of cut limiter* |
| Broken Cutter | Use a more impact resistant cutter | Use a cutter with a bigger bevel to make the cutter less aggressive<br>Use a cutter with a larger diamond grain in the diamond table<br>Use a cutter with increased impact resistance (e.g., a conical or ridged cutting element that cuts over a larger area, and is less pointed loaded, and can be less aggressive)<br>Choose specific cutting element orientation, so that the lowest residual stress portion of diamond table (based on interface design and pressure) at the cutting tip*<br>Increase the negative back rake angle*<br>Increase the cutter size* |
| Spalled Cutter | Use a higher quality cutter | Identify vendors with more controlled processes on diamond grain, press pressure/temperature, etc. so that there is less deviation between cutters |
| Delaminated Cutter | Use a stronger diamond/substrate interface | Choose a cutting element that has lower residual stresses at the interface between the diamond and substrate<br>Orient lower residual stress portion of interface at the cutting edge<br>Reduce forces on the cutting element (e.g., by increasing negative angle of cutting element)*<br>Increase the negative back rake angle*<br>Increase the cutter size* |

TABLE 1-continued

| Wear mode | General Recommendation | Specific Recommendation |
| --- | --- | --- |
| Bond Failure | Inspect for manufacturing defect in the cutters | Choose cutting elements from manufacturers with fewer quality issues (e.g., monitor historical trends of cutter quality) |
| Lost Cutter | Improve the braze between the cutting element and the bit | Monitor braze process to ensure proper braze coverage<br>Use a higher quality braze |
| Unworn Cutter | Increase aggressiveness of the cutting element | Change the cutter type to a more aggressive cutter (e.g., a scoop shaped rather than a flat cutting element)<br>Make the bevel on the cutter smaller<br>Decrease the negative back rake* |

The current system can recommend any of these options (or others). In some cases, the system may monitor the results by evaluating the bit when it again is run and scanned. If the same type of damage occurs, a different course of action may be recommended in order to mitigate the damage. If another type of damage occurs, other recommendations may also be made; however, a historical model may be maintained to avoid returning to a previous design known to have issues.

Some drill bits made of a steel or matrix (e.g., tungsten carbide with metal-based binder), and have blades with cutting elements placed in specifically formed pockets, and then brazed therein. Because the pockets are fixed, the position of a cutter (including a replacement attached during repair), is generally fixed. As a result, some of the recommendations are not possible with these bits (e.g., changing rake angle, changing cutter size, changing cutter depth, changing number of cutters). Examples of these recommendations are noted in Table 1 with an asterisk.

Figure 6:
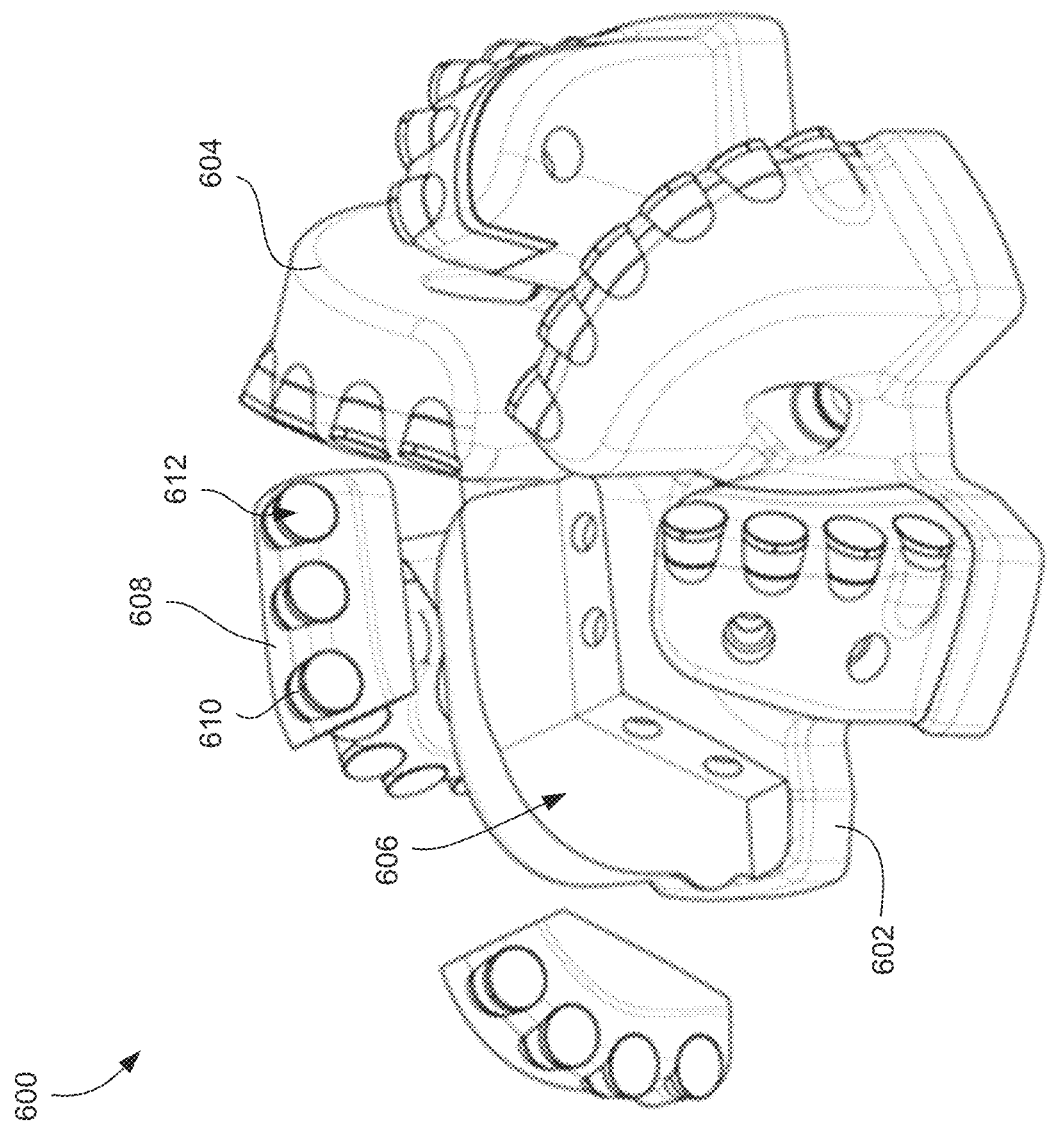
FIG. 6 is a perspective, partially-exploded view of a drill bit having modular segments, according to an embodiment.

In other embodiments, however, a modular bit, such as the bit shown in FIG. 6 may be employed. Specifically, FIG. 6 shows a perspective, partially exploded view of a modular bit 600, according to an embodiment. The modular bit 600 generally includes a bit head 602 and a plurality of blades 604 extending therefrom. Each of the blades 604 provides a receiving area 606 thereof. The bit 600 further includes a plurality of modular segments 608, which may each include cutters 610, received into pockets 612 formed in the segments 608. The modular segments 608 may be removably secured in the receiver area 606.

These segments 608 may be machined, cast, or formed by additive manufacturing. The segments can be any suitable material, e.g., steel base with a wear resistant material, such as tungsten carbide. Because these segments can be formed independently, and can even potentially be formed at the well site, they can be manufactured in a way that allows the bit design to change. It may be possible to move pockets 612 and to change pockets so that the angle, type, or size of the cutter changes. It is thus possible during the repair of a bit to print or cast a new segment, attach it to a primary or secondary bit blade, and have cutting elements with different aggressiveness (e.g., different rake angles), different sizes, different shapes or orientations, different layouts, or even additional elements (e.g., back-up or depth-of-cut limiting element).

FIGS. 7A, 7B, 7C, and 7D illustrate potential modifications that may be made to a given segment 608, according to an embodiment. As explained above, these modifications allow for a change in cutter 610 and/or pocket 612 geometry and/or positioning, at least, without replacing an entire bit.

Figure 7A:
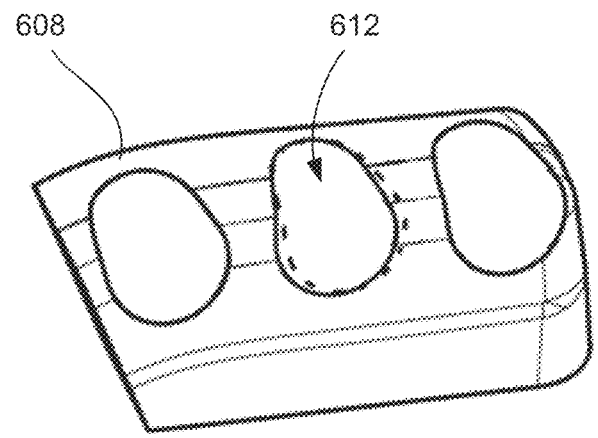
FIGS. 7A, 7B, 7C, and 7D are perspective views of segments having modified pockets, according to an embodiment.
Figure 7B:
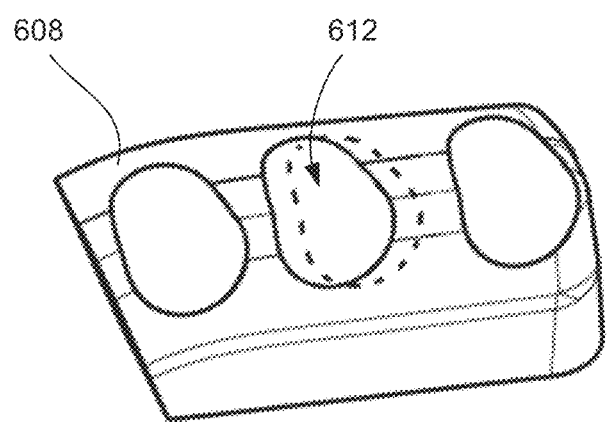

In FIGS. 7A and 7B, the rake angle of the pocket 612 may be changed. For example, it may be determined that the hardened segment 608 should be replaced to change the cutting structure. For instance, certain types of damage (e.g., delamination) may be the result of a cutting element being too aggressive. A new hardened segment may be printed or cast, and the resulting segment may have a different rake angle on the cutter, by forming a pocket having a different angle. The original pocket 608 (i.e., before being replaced with a new segment 608) is shown with dashed lines.

Figure 7C:
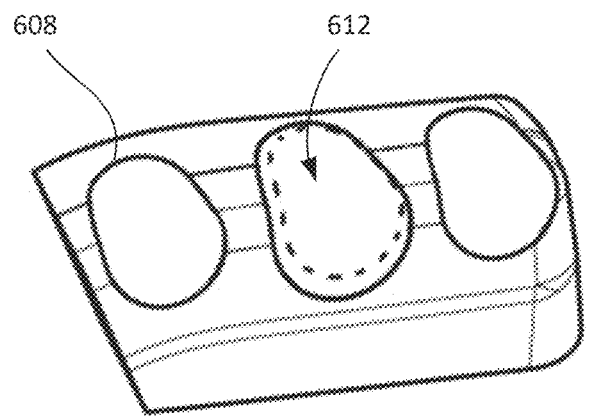
Figure 7D:
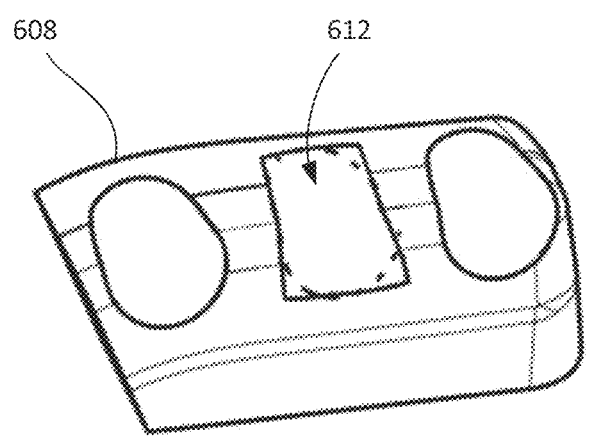

In other cases, it may be determined during the repair that a cutting element should be moved (e.g., if a hardened segment is showing too much wear, indicating a gap in the cutting structure). As shown by FIG. 7C, the cutter 610 may be moved radially along the hardened segment 608, or a larger cutter 610 may be positioned on the hardened segment 608, as shown in FIG. 7D.

In still other cases, it may be beneficial to change the shape of the cutter 610, so a new cutter pocket can be formed to handle the revised shape of the substrate. FIG. 7D shows an example of a segment 608 in which a pocket 612 is changed from a cylindrical geometry to a rectangular/cubic geometry.

It will be appreciated that the above-discussed modifications to a segment 608 are merely some examples among many contemplated. The pockets 612 may be smaller or have a more aggressive angle in other cases. In other cases, the height of the hardened segment 608 may increase or decrease (e.g., for some or the entire length), so cutters 610 may be positioned at different axial positions.

In addition, through this repair process, bits may not only be repaired to have the same cutting structure as the original, but may also have a different cutting structure as pockets may be moved or changed.

Figure 8:
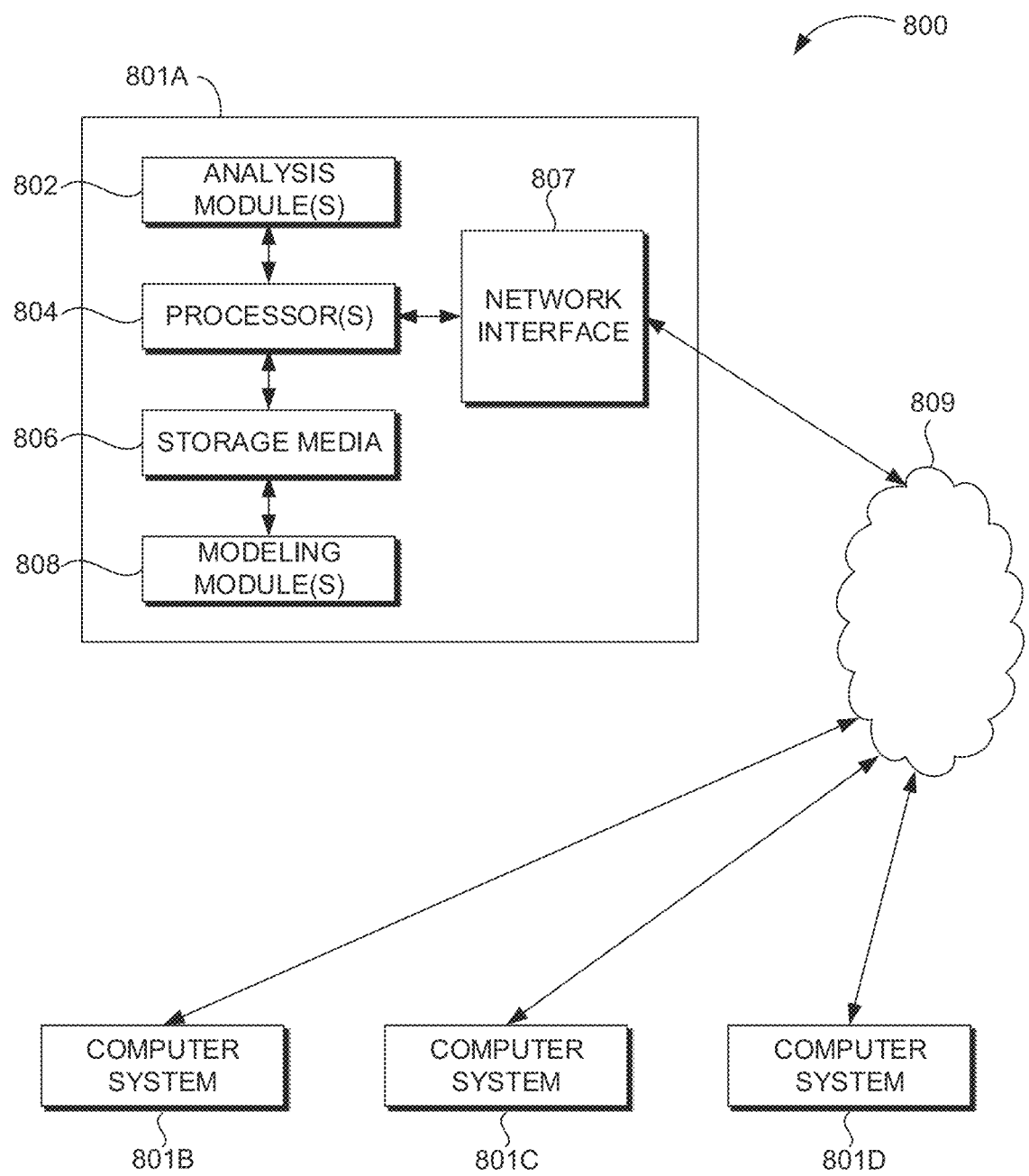
FIG. 8 is a schematic view of a computing system, according to an embodiment.

In some embodiments, the methods of the present disclosure may be executed by a computing system. FIG. 8 illustrates an example of such a computing system 800, in accordance with some embodiments. The computing system 800 may include a computer or computer system 801A, which may be an individual computer system 801A or an arrangement of distributed computer systems. The computer system 801A includes one or more analysis modules 802 that are configured to perform various tasks according to some embodiments, such as one or more methods disclosed herein. To perform these various tasks, the analysis module 802 executes independently, or in coordination with, one or more processors 804, which is (or are) connected to one or more computer-readable media 808. The processor(s) 804 is (or are) also connected to a network interface 807 to allow the computer system 801A to communicate over a data network 809 with one or more additional computer systems and/or computing systems, such as 801B, 801C, and/or 801D (note that computer systems 801B, 801C and/or 801D may or may not share the same architecture as computer system 801A, and may be located in different physical locations, e.g., computer systems 801A and 801B may be located in a processing facility, while in communication with one or more computer systems such as 801C and/or 801D that are located in one or more data centers, and/or located in varying countries on different continents).

A processor may include a microprocessor, microcontroller, processor module or subsystem, programmable integrated circuit, programmable gate array, or another control or computing device.

Note that while in the example embodiment of FIG. 8, computer-readable media 806 is depicted as within computer system 801A, in some embodiments, computer-readable media 806 may be distributed within and/or across multiple internal and/or external enclosures of computing system 801A and/or additional computing systems. The computer-readable media 806 may be implemented as one or more computer-readable or machine-readable storage media, transmission media, or a combination of storage and transmission media.

As used herein, "storage media", "computer-readable storage media," and the like refer to physical media that stores software instructions in the form of computer-readable program code that allows performance of embodiments of the present disclosure. "Transmission media", "computer-readable transmission media," and the like refer to non-physical media which carry software instructions in the form of computer-readable program code that allows performance of embodiments of the present disclosure. Thus, by way of example, and not limitation, embodiments of the present disclosure can include at least two distinctly different kinds of computer-readable media, namely storage media and/or transmission media. Combinations of storage media and transmission media should be included within the scope of computer-readable media.

To further illustrate the distinct nature of storage media and transmission media, storage media 806 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or solid state drives, or other types of storage devices.

Transmission media may conversely include communications networks or other data links that enable the transport of electronic data between computer systems and/or modules, engines, and/or other electronic devices. When information is transferred or provided over a communication network or another communications connection (either hardwired, wireless, or a combination of hardwired or wireless) to a computing device, the computing device properly views the connection as a transmission medium. Transmission media can therefore include a communication network and/or data links, carrier waves, wireless signals, and the like, which can be used to carry desired program, code means, or instructions.

Note that the instructions discussed above may be provided on one computer-readable or machine-readable medium, or may be provided on multiple computer-readable or machine-readable media distributed in a large system having possibly plural nodes. Such computer-readable or machine-readable medium or media is (are) considered to be part of an article (or article of manufacture). An article or article of manufacture may refer to any manufactured single component or multiple components. The computer-readable medium or media may be located either in the machine running the machine-readable instructions, or located at a remote site from which machine-readable instructions may be downloaded over a network for execution. Further, where transmission media is used, upon reaching various computing system components, program code in the form of computer-executable instructions or data structures can be transferred automatically or manually from transmission media to storage media (or vice versa). For example, computer-executable instructions or data structures received over a network or data link can be buffered in memory-type storage media (e.g., RAM) within a network interface module (NIC), and then eventually transferred to computer system RAM and/or to less volatile storage media (e.g., a hard drive) at a computer system. Thus, it should be understood that storage media can be included in computer system components that also (or even primarily) utilize transmission media.

In some embodiments, computing system 800 contains one or more modeling module(s) 808. In the example of computing system 800, computer system 801A includes the modeling module 808. In some embodiments, a single modeling module may be used to perform some aspects of one or more embodiments of the methods disclosed herein. In other embodiments, a plurality of modeling modules may be used to perform some aspects of methods herein.

It should be appreciated that computing system 800 is merely one example of a computing system, and that computing system 800 may have more or fewer components than shown, may combine additional components not depicted in the example embodiment of FIG. 8, and/or computing system 800 may have a different configuration or arrangement of the components depicted in FIG. 8. The various components shown in FIG. 8 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure.

Computational interpretations, models, and/or other interpretation aids may be refined in an iterative fashion; this concept is applicable to the methods discussed herein. This may include use of feedback loops executed on an algorithmic basis, such as at a computing device (e.g., computing system 800, FIG. 8), and/or through manual control by a user who may make determinations regarding whether a given step, action, template, model, or set of curves has become sufficiently accurate for the evaluation of the subsurface three-dimensional geologic formation under consideration.

The terms "couple," "coupled," "connect," "connection," "connected," "in connection with," and "connecting" refer to "in direct connection with" or "in connection with via one or more intermediate elements or members."

In the claims, means-plus-function clauses are intended to cover the structures described herein as performing the recited function and not merely structural equivalents, but also equivalent structures. It is the express intention of the applicant not to invoke functional claiming for any limitations of any of the claims herein, except for those in which the claim expressly uses the words "means for" or "step for" together with an associated function.

Although a few example embodiments have been described in detail above, those skilled in the art will readily appreciate that many modifications are possible in the example embodiments without materially departing from the scope of the present disclosure. Accordingly, any such modifications are intended to be included within the scope of this disclosure.

The invention claimed is:

1. A method comprising:
    receiving an image of an oilfield tool removed from a wellbore, wherein the oilfield tool comprises a cutter, the image received from an image-capture device via a network at a processor;
    decoding the image and identifying the cutter, using the processor;
    determining a wear mode for the cutter by providing the decoded image to a neural network, wherein the wear mode is determined from a plurality of different wear modes comprising: a worn cutter and an unworn cutter;
    recommending replacing the cutter with a replacement cutter based on the determined wear mode, wherein when the wear mode is the worn cutter, the replacement cutter comprises a different leach depth than a designed leach depth of the cutter, and wherein when the wear mode is the unworn cutter and the cutter is a flat cutter, the replacement cutter comprises a non-planar cutter; and
    transmitting the recommendation to a remote device over the network.

2. The method of claim 1, wherein when the wear mode is the unworn cutter, the replacement cutter comprises a lower quality cutter.

3. The method of claim 1, comprising:
    applying a bounding box to the cutter identified in the image, using the processor, prior to determining the wear mode.

4. The method of claim 3, comprising transmitting a location of the bounding box to the image-capture device for display thereon while capturing additional images of the oilfield tool with the cutter.

5. The method of claim 4, comprising transmitting an identification of the wear mode for display with the bounding box while capturing additional images of the oilfield tool with the cutter.

6. The method of claim 1, comprising:
    recommending a change in an application or a configuration of the oilfield tool based on the wear mode; and
    transmitting the recommendation to the remote device over the network.

7. The method of claim 6, comprising:
    receiving data associated with conditions of use of the oilfield tool, wherein recommending the change of the application of the oilfield tool is based on the conditions of the use of the oilfield tool prior to capture of the image.

8. The method of claim 6, wherein when the wear mode is the worn cutter, the recommendation comprises exchanging the cutter with an alternative cutter that comprises a different leach depth than the cutter or a smaller diamond grain than the cutter, and when the wear mode is the unworn cutter the recommendation comprises exchanging the cutter with the alternative cutter that comprises a different geometry than the cutter or a lower quality than the cutter.

9. The method of claim 1, comprising:
    training the neural network using a training corpus that includes a plurality of images with associated wear mode conclusions, wherein training includes receiving at least one of the wear mode conclusions provided by a human.

10. The method of claim 1, comprising determining a consumption for the cutter by providing the decoded image to the neural network, wherein the consumption represents an amount of degradation, and wherein the consumption is a value determined based on an amount of the cutter that is remaining in the oilfield tool.

11. A system for characterizing degradation of a tool, the system comprising:
    a remote device deployed in an oilfield proximate a wellbore and configured to obtain an image captured of the oilfield tool and one or more cutters of the oilfield tool removed from the wellbore; and
    a processor configured to perform operations by executing instructions contained on one or more computer-readable storage media, the operations including:
        receiving the image of the one or more cutters of the tool from the remote device;
        decoding the image to identify the one or more cutters; and
        determining a wear mode and a consumption for the one or more cutters by providing the decoded image to a neural network, wherein the wear mode is determined from a plurality of different wear modes comprising: a worn cutter and an unworn cutter;
        recommending replacing the one or more cutters with one or more respective replacement cutters based on the determined wear mode, wherein the one or more replacement cutters differ from the one or more cutters due to designed leach depth, and wherein when the wear mode is the unworn cutter and the cutter is a flat cutter, the replacement cutter comprises a non-planar cutter; and
        transmitting the recommendation to a device over a network.

12. The system of claim 1, wherein the operations further include:
    recommending a change in an application of the oilfield tool or a change in a design of the oilfield tool based on the determined wear mode and the consumption; and
    transmitting the recommendation to the device over a network.

13. The system of claim 11, wherein the processor includes an application-program interface that enables the processor to decode the image and apply one or more bounding boxes to the identified one or more cutters.

14. The system of claim 13, wherein the application-program interface enables the processor to apply an identification of the determined wear mode with the one or more bounding boxes to the identified one or more cutters.

15. The system of claim 11, further comprising:
    a database in communication with the processor, wherein the operations further include tracking data related to use of the tool, the cutter, or both in the database in association with the determined wear mode or consumption, and wherein recommending includes determining an association between the tool use and the wear mode, the consumption, or both.

16. A method comprising:

receiving an image of an oilfield tool removed from a wellbore, wherein the oilfield tool comprises a cutter, the image received from an image-capture device via a network at a processor;

decoding the image and identifying the cutter, using the processor;

determining a wear mode for the cutter by providing the decoded image to a neural network, wherein the wear mode is determined from a plurality of different wear modes comprising: a worn cutter and an unworn cutter;

recommending replacing the cutter with a replacement cutter based on the determined wear mode, wherein when the wear mode is the worn cutter, the recommendation comprises exchanging the cutter with an alternative cutter that comprises a different diamond grain than the cutter, and when the wear mode is the unworn cutter the recommendation comprises exchanging the cutter with the alternative cutter that comprises a different geometry than the cutter or a lower quality than the cutter; and transmitting the recommendation to a remote device over the network.

17. The method of claim 16, comprising determining a consumption for the cutter by providing the decoded image to the neural network, wherein the consumption represents an amount of degradation, wherein the consumption is a value determined based on an amount of the cutter that is remaining in the oilfield tool, and recommending replacing the cutter with a replacement cutter based on the determined wear mode and the consumption.

18. The method of claim 1, wherein when the wear mode is the unworn cutter, the replacement cutter comprises a second bevel smaller than a first bevel of the unworn cutter, a second back rake angle less than a first back rake angle of the unworn cutter, or any combination thereof.

* * * * *